W. A. THOMPSON.
POTATO DIGGING ATTACHMENT FOR PLOWS.
APPLICATION FILED NOV. 2, 1916.
1,243,898. Patented Oct. 23, 1917.
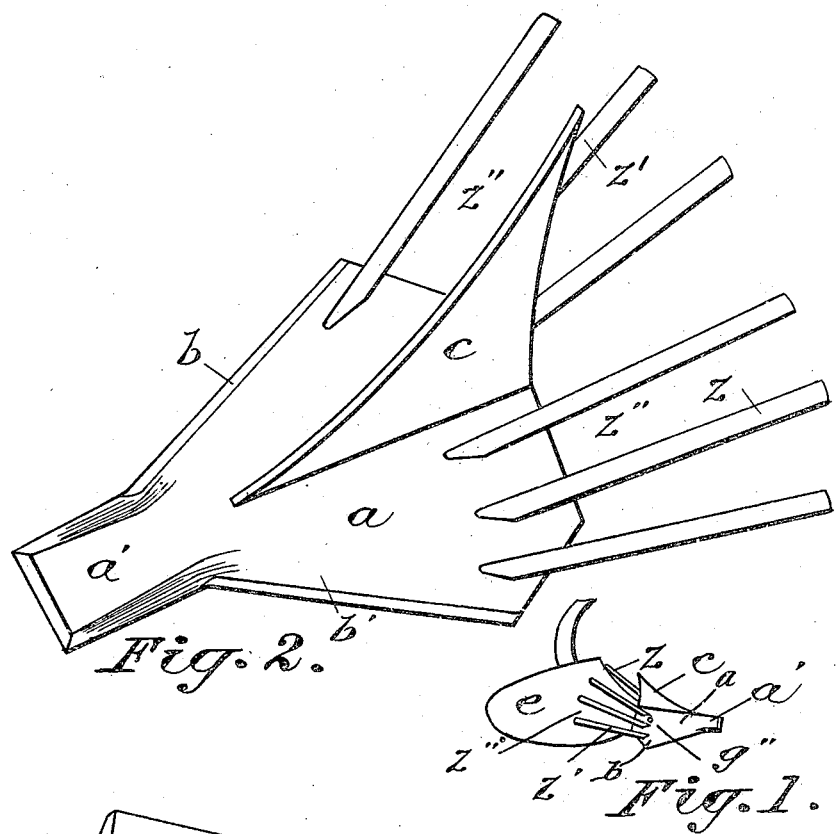
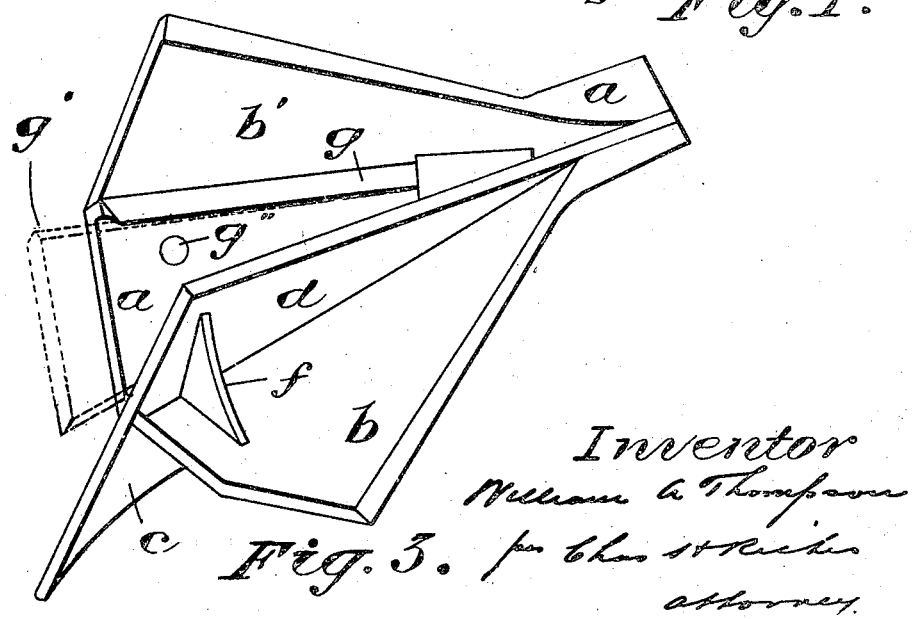

UNITED STATES PATENT OFFICE.

WILLIAM A. THOMPSON, OF WALKERTON, ONTARIO, CANADA.

POTATO-DIGGING ATTACHMENT FOR PLOWS.

1,243,898.   Specification of Letters Patent.   Patented Oct. 23, 1917.

Application filed November 2, 1916. Serial No. 129,221.

*To all whom it may concern:*

Be it known that I, WILLIAM ALEXANDER THOMPSON, of the town of Walkerton, in the county of Bruce and Province of Ontario, Dominion of Canada, have invented certain new and useful Improvements in Potato-Digging Attachments for Plows; and I hereby declare that the following is a full, clear, and exact description of the same.

This invention relates to a potato digging attachment for a plow by which the tubers can be dug, separated from the earth, and deposited on the ground to be subsequently gathered, the object of the invention being to so construct the attachment that it can be readily substituted for the plow share for the harvesting of the potato crop, the attachment being constructed and used as hereinafter set forth.

In the drawings; Figure 1, is a perspective view showing the digger attached to a plow; Fig. 2, is a detail view of the digger on a larger scale than Fig. 1; and Fig. 3, is an inverted view of the digger on the same scale as Fig. 2.

Like characters of reference refer to like parts throughout the specification and drawings.

The digger consists essentially of a share $a$, having a point $a'$, two corresponding wings $b$, $b'$, and a land breaking colter $c$, the wings being of a substantially triangular shape and slanting rearwardly-upwardly from the point and downwardly-laterally from the colter, the latter being at an obtuse angle to the wings and having its front edge rounded or dulled to avoid cutting the tubers.

The wings carry toward their rear edges two sets of separating fingers $z'$, $z$, respectively connected to the wings on opposite sides of the colter, and extending rearwardly-upwardly therefrom, the separating fingers diverging gradually toward their outer extremities.

On the under side of the share, vertically below the colter, is a perpendicular web $d$, which forms a continuation of the land side of the mold board of the plow when the digger is attached to the latter, and integral with the web and wing $b$, near the rear of the digger, is a brace $f$ to strengthen the same.

On the under side of the wing $b'$, is a guide $g$, to receive the plow frame $g'$, for the attachment of the digger thereto.

All of the parts which have now been described may be integrally cast or may be separately made and subsequently assembled as may be deemed advisable.

In the use of the attachment, the potato digger is fitted to the plow by removing the ordinary plow share, inserting the plow point $g'$, in the guide $g$, and passing a bolt $g''$, through the wing $b'$, and point $g'$, the guide and the bolt, when the nut is tightened on the latter, securely holding the potato digger in its assembled relation with the other plow parts.

The potato digger is then ready for use, and as the plow is drawn along the potato rows, the point $a'$, and wings $b$, $b'$, penetrate the ground to a depth below the tubers, the colter then breaking and loosening the earth for the subsequent separation of the tubers therefrom, the loosened earth, with the tubers therein rising on the separating fingers and falling through the spaces $z''$, between them, while the contained tubers, which are carried rearwardly upon the fingers of the separator begin bunching upon the same. Some of these tubers are shaken loose from the vines and fall through the spaces between the separating fingers, while others are pushed over the rear ends of the same, and the remainder are directed downwardly to the sides of the digger by the downward-lateral slant of the wings and fingers, all of which tend to shake the tubers loose from the vines and lay them on the top of the ground.

The general construction of the digger share will be the same for all types of plows, but minor alterations to the wing $b'$, may be necessary to permit of the share properly fitting the particular plow with which it is to be used.

Having thus fully described my invention what I claim as new and desire to secure by Letters Patent is:—

A potato digging attachment for a plow comprising a share having a point, two corresponding wings, and a land breaking colter, the wings slanting rearwardly and upwardly from the point and downwardly-laterally from the colter, the colter being at an obtuse angle to the wings, a web on the under side of the share vertically below the colter, a guide on the under side of one of the wings to receive the plow point for the attachment of the digger thereto and a set of separating fingers extending rearwardly and upwardly from the share.

Toronto, Ontario, September 8th, 1916.

WILLIAM A. THOMPSON.

Signed in the presence of—
  GEO. H. RICHES,
  CHAS. H. RICHES.